United States Patent
Singh et al.

(10) Patent No.: US 9,959,371 B2
(45) Date of Patent: May 1, 2018

(54) METHOD FOR EFFICIENT DESIGNING AND OPERATING COOLING INFRASTRUCTURE IN A DATA CENTER

(71) Applicant: Tata Consultancy Services Limited, Mumbai (IN)

(72) Inventors: Amarendra K. Singh, Pune (IN); Harshad Bhagwat, Pune (IN); Umesh Singh, Pune (IN); Rohan Amarnath, Pune (IN); Anand Sivasubramaniam, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 422 days.

(21) Appl. No.: 14/428,122

(22) PCT Filed: Mar. 20, 2013

(86) PCT No.: PCT/IN2013/000185
§ 371 (c)(1),
(2) Date: Mar. 13, 2015

(87) PCT Pub. No.: WO2014/041554
PCT Pub. Date: Mar. 20, 2014

(65) Prior Publication Data
US 2015/0363515 A1   Dec. 17, 2015

(30) Foreign Application Priority Data

Sep. 12, 2012   (IN) .......................... 2643/MUM/2012

(51) Int. Cl.
*G06F 17/50* (2006.01)
*H05K 7/20* (2006.01)

(52) U.S. Cl.
CPC ...... *G06F 17/5004* (2013.01); *G06F 17/5072* (2013.01); *H05K 7/20836* (2013.01); *G06F 2217/78* (2013.01); *G06F 2217/80* (2013.01)

(58) Field of Classification Search
CPC .............. H05K 7/2059; H05K 7/20836; G06F 2217/78; G06F 2217/80
See application file for complete search history.

(56) References Cited

U.S. PATENT DOCUMENTS 8,249,825 B2   8/2012 Vangilder et al.
8,346,398 B2   1/2013 Ahmed et al.
(Continued)

OTHER PUBLICATIONS

Muenstermann, S. J. "Industrializing Data Centers to Reach PUE Benchmark 1.2" [online]. Feb. 2011 [retrieved on May 8, 2017]. Retrieved from the Internet: https://www.honeywellprocess.com/library/marketing/whitepapers/IndustrializingDataCenterFeb2011.pdf.*

(Continued)

*Primary Examiner* — Saif A Alhija
(74) *Attorney, Agent, or Firm* — Finnegan, Henderson, Farabow, Garrett & Dunner LLP

(57) ABSTRACT

A method and system is disclosed for maintaining Power Usage Effectiveness (PUE) of a new data center constant or within narrow range around efficient level during ramping up stage of the data center. The method comprises of capturing a plurality of design and operational parameters of the data center, computing an efficient design for the data center at full occupancy, and maintaining the Power Usage Effectiveness constant or within narrow range around efficient level at a current occupancy during a ramp up period of the data center.

12 Claims, 10 Drawing Sheets

(56) References Cited

U.S. PATENT DOCUMENTS

| | | |
|---|---|---|
| 8,374,928 B2 | 2/2013 | Gopisetty et al. |
| 8,401,833 B2 | 3/2013 | Radibratovic et al. |
| 8,514,572 B2 | 8/2013 | Rogers |
| 8,712,735 B2 | 4/2014 | Vang1lder et al. |
| 2009/0112522 A1 | 4/2009 | Rasmussen |
| 2009/0150123 A1* | 6/2009 | Archibald ........... G06F 17/5004 703/1 |
| 2010/0082309 A1* | 4/2010 | Dawson ................... G06F 1/20 703/6 |
| 2011/0016342 A1 | 1/2011 | Rowan et al. |
| 2011/0220324 A1 | 9/2011 | Lindenstruth et al. |

OTHER PUBLICATIONS

Umesh Singh, Amarendra K Singh, Parvez S and Anand Sivasubramaniam: "CFD-Based Operational Thermal Efficiency Improvement of a Production Data Center"; Tata Consultancy Services Ltd., India 2010 (7 pages).

"Modular Natural Free Cooling Mnfc—Pue 1.07"; AST Modular Solutions 2011 (5 pages).

Kien Le. Jingru Zhang, Jiandong Meng. Ricardo Bianchini, Yogesh Jaluma, and Thu D. Nguyen; "Reducing Electricity Cost Through Virtual Machine Placement in High Performance Computing Clouds"; Rutgers University (12 pages).

James W. Smith and Ian Sommerville; "Workload Classification & Software Energy Measurement for Efficient Scheduling on Private Cloud Platforms"; School of Computer Science, University of St Andrews; Jan. 2010 (10 pages).

International Search Report and Written Opinion dated Jan. 15, 2014, in International Application No. PCT/IN2013/000185 (7 pages).

* cited by examiner

METHOD FOR EFFICIENT DESIGNING AND OPERATING COOLING INFRASTRUCTURE IN A DATA CENTER

CROSS-REFERENCE TO RELATED PATENT APPLICATIONS

This application is a National Stage Entry under 35 U.S.C. § 371 of International Application No. PCT/IN2013/000185, filed on Mar. 20, 2013, which claims priority from Indian Patent Application No. 2643/MUM/2012, filed on Sep. 12, 2012. The entire contents of the above-referenced applications are expressly incorporated herein by reference for all purposes.

FIELD OF INVENTION

The invention is related to thermal management in data centers. More particularly, the invention is related to system and method for maintaining Power Usage Effectiveness (PUE) of a new data center constant or within narrow range around efficient level during ramping up stage of the data center.

BACKGROUND OF THE INVENTION

A data center typically contains information technology (IT) equipment like servers, telecom equipment, networking equipment, switches and other IT equipment arranged in racks or frames. The heat generated by such IT components is cooled with the help of cooling units. Typically, the cooling units are computer room air conditioners (CRAC) or computer room air handlers (CRAH) which supply cold air or air draft to cool the heat generated. More recently advanced cooling units such as in-row coolers, rear door coolers, liquid cooled cabinets and chip cooling techniques have come into practice.

Data centers have now become energy guzzlers. With the drastic increase in energy prices, the huge energy bill is one of the major concerns for the data center managers. Power consumed by cooling equipment contributes to a major portion of the total data center power consumption. The main challenge is to ensure safety of IT equipment by ensuring appropriate temperatures in the data center and at the same time ensuring efficient cooling efficiency of the data center. Due to poor design of the data center, data center mangers face lot of problems like hot spots, low tile flow rates etc. General measures taken are to decrease supply temperature of cooling units, increase cooling capacity near the problem area etc. These measures lead to decrease in cooling efficiency. Hot spots and low cooling efficiency are the major challenges faced by data center managers in thermal management of data centers.

Owing to the challenges stated above, various attempts have been made to design and operate new data centers efficiently. Efficient design of data center include proper arrangement of racks, tiles, CRACs etc, adequate plenum depth, use of airflow management techniques such as aisle containment etc. Efficient control schemes have been developed to control parameters of CRAC like supply temperature, supply flow rate or tile flow rates in accordance to changes in heat generation, temperature, pressure and airflows in the data center. These control schemes make CRAC run at efficient possible efficiency while maintaining satisfactory temperatures in the data center at the same time. Different algorithms for workload placements have been developed which take cooling related parameters like recirculation, CRAC capacities into account while executing placement requests. Numerical models such as computational fluid dynamic (CFD) models as well as data based models using neural networks are being used to facilitate efficient control schemes.

The attempts towards efficient designing of new data center aim at exploration of efficient design and operation parameters pertaining to fully occupied data center. However, the new data centers seldom are occupied within short time. The time of ramping up of a new data center ranges from few months to few years depending upon financial constraints, business constraints, resources availability etc. In some cases, the data center may never be completely occupied for many years because it is designed for expected future needs. The data center operates at inefficient conditions during this time of ramping up of data center as its efficient possible efficiency is ensured only for the full occupancy. Hence, there is a need for a method for maintaining PUE of a data center constant/within narrow range during ramping up.

OBJECTIVES OF THE INVENTION

In accordance with the present disclosure, the primary objective is to provide a method and system for configuring the data center at full occupancy in order to maintain Power Usage Effectiveness constant or within narrow range around efficient level.

Another objective of the disclosure is to provide a method and system for maintaining the Power Usage Effectiveness constant or within narrow range around efficient level during a ramp-up process of the data centers.

Another objective of the present disclosure is to provide a method and a system that explores the efficient design and operational parameters to maintain Power Usage Effectiveness of the data centers constant or within narrow range around efficient level during ramp-up process.

SUMMARY OF THE INVENTION

Before the present methods and apparatuses are described, it is to be understood that this invention is not limited to the particular apparatus and methodologies described, as there can be multiple possible embodiments of the present invention, which are not expressly illustrated, in the present disclosure. It is also to be understood that the terminology used in the description is for the purpose of describing the particular versions or embodiments only, and is not intended to limit the scope of the present invention, which will be limited only by the appended claims.

An aspect of the present disclosure is to efficiently configure a data center at full occupancy, having an initial empty occupancy level. Design parameters of the data center at the empty occupancy level are captured. The design parameters are mapped with a plurality of predefined partitions of the data center at the empty occupancy level. Further, each of the predefined partitions is mapped with a plurality of predefined rack placements and heat load distribution. Predefined cooling infrastructure parameters associated with each of the said rack placements is mapped with the heat load distribution for at least one permutation. The cooling performance for said permutations is analyzed, for the cooling infrastructure related parameters mapped with rack placements and heat load distributions for said partitions mapped with the design parameters, using a Computational Fluid Dynamics (CFD) tool. Power Usage Effectiveness (PUE) using a PUE predictor tool is determined for each of the mapped permutations. The data center is configured based on the mapped permutation having optimum cooling performance and least Power Usage Effectiveness.

A PUE predictor model integrating an IT power predictor, a cooling power predictor and a power losses predictor work in tandem to determine the Power Usage Effectiveness for each of the permutations. The IT power predictor tool calculates the power consumed by IT equipment, cooling power predictor calculates the power consumed by entire cooling infrastructure, and all associated equipment for various operating conditions and the power losses predictor sums lighting power and losses from all types of equipment estimated by correlating efficiency with loading level of the equipment.

Another aspect of the present disclosure is to dynamically maintain Power Usage Effectiveness of a data center constant or within a narrow range around an efficient level during a ramp up period of the data center. The dynamic maintenance of PUE starts with capturing design and operational parameters of the data center at a current occupancy level. Then, mapping the captured design and operational parameters with predefined placements of servers is carried out. Further, mapping cooling infrastructure parameters with each of the said placements of servers for at least one permutation of said placement of servers mapped with said design and operational parameters at current occupancy of the data center is carried out. The cooling performance for each of said permutations at the current occupancy of the data center is analyzed using a CFD tool. Exploring and determining the Power Usage Effectiveness for the data center at a current occupancy using a PUE predictor tool for the at least one permutation of the data center analyzed by the CFD tool is carried out. Then, configuring and operating the data center based on the permutation having lowest PUE and optimum cooling performance is done.

BRIEF DESCRIPTION OF DRAWINGS

The foregoing summary, as well as the following detailed description of preferred embodiments, is better understood when read in conjunction with the appended drawings. Drawings and illustrations described herein are intended to lay more emphasis on understanding the underlying principle of the invention. The manner in which the drawings are presented in no way limit the scope of the invention and the advantages one can garner from the embodiments of the present invention.

DETAILED DESCRIPTION

Some embodiments of this invention, illustrating its features, will now be discussed:

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems, methods, apparatuses, and devices similar or equivalent to those described herein can be used in the practice or testing of embodiments of the present invention, the preferred, systems and parts are now described.

The disclosed embodiments are merely exemplary of the invention, which may be embodied in various forms.

The present application uses specific terminologies such as CRAC, rack, IT equipment, server only for simplicity. The subject matter of the present application is applicable to any other heat generating equipment like IT and electrical equipment, telecommunications equipment, any cooling units such as in-row coolers, any type of air delivery mechanism such as overhead ducts.

Figure 1:
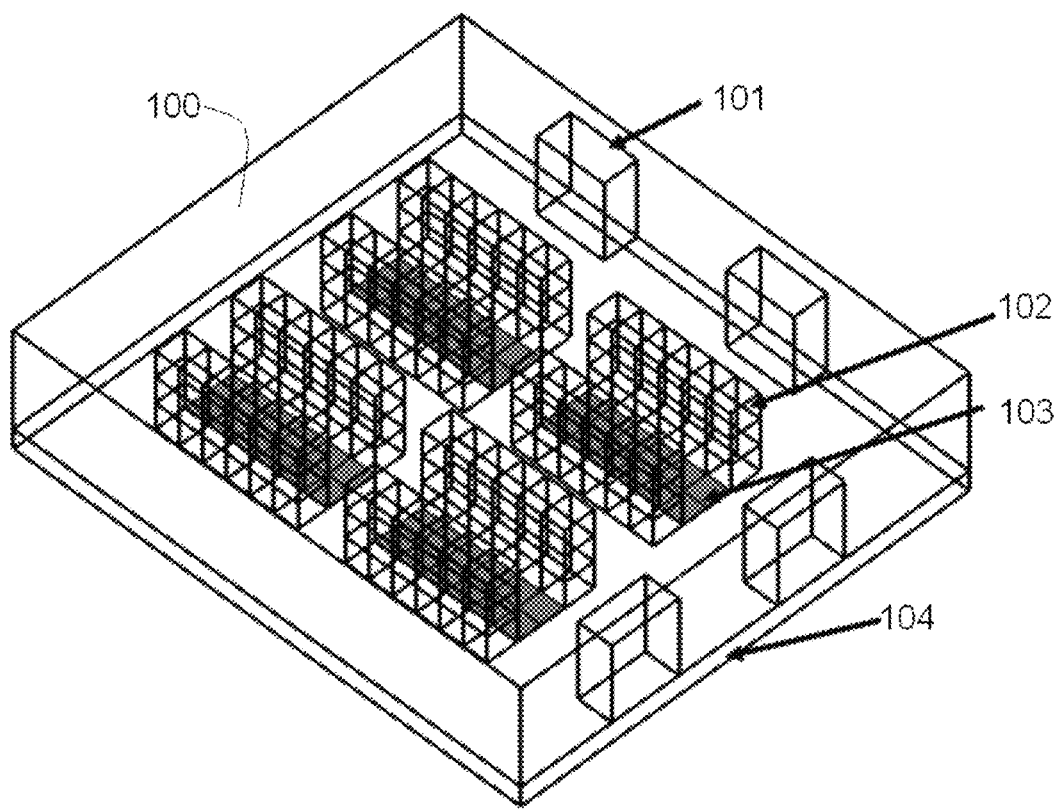
FIG. 1, Prior Art, a conventional data center.

Referring to FIG. 1 is an isometric view of a conventional data center, prior art. The data center (100) contains a plurality of racks (102), wherein said racks (102) house various IT and electric equipment and the racks (102) are arranged in rows. The heat generated by the IT and electric equipment is cooled by a plurality of computer room air conditioners (CRAC's) (101), which are positioned near periphery of the data center (100). These CRACs (101) enable cold air to flow into an under-floor plenum (104). The cold air from the CRACs (101) is delivered to the intended places like frontal side of the racks (102) through tiles or vents (103). The equipment typically has fans for circulating cold air. The cold air circulated picks up the heat generated and the hot air is exhausted. The exhausted hot air is re-circulated by CRACs.

Above discussion illustrates an example of cooling infrastructure in a conventional data center. There are various other types of cooling infrastructures in practice. Cooling infrastructure is a combination of various cooling equipment, several auxiliary units, and air delivery mechanism. Cooling units can be of any types such as DX units, in-row coolers, and rack liquid cooler. Accordingly, auxiliary units include chillers, pumps, cooling towers etc. There are various air delivery mechanisms in practice like overhead plenum, separate CRAC room, and ducts.

A state of the data center can be characterized based on two sets of parameters: design parameters and operating parameters. Design parameters include parameters associated with cooling infrastructure, CRAC, racks, heat generating equipment in racks, placement of components such as CRAC, tiles, plenum, racks, and placement of airflow altering components such as baffles or panels. For example, parameters associated with cooling units may include position of supply and return of air, dimensions of the cooling units such as height, width etc. Operating parameters include supply temperature and flow rates of CRAC, actual power consumed by racks, airflow of racks, or any other parameters associated which change dynamically during operation of the data center.

The metrics used in the disclosure are explained below:
1) Occupancy level: During designing of the data center, various design parameters as well as operating parameters are decided. In addition, the maximum power consumed by IT equipment (i.e. maximum IT power) is decided from the current and expected future computational requirements. However, data centers are occupied in steps during the ramp-up period. This ramp-up period can be of few years. For partially occupied data center, an occupancy level can be defined using Equation (1) stated below:

$$\% \text{ Occupancy level} = \frac{\text{Maximum } IT \text{ power in the current state of the data center}}{\text{Maximum } IT \text{ power for fully occupied data center}} \times 100 \quad \text{Equation (1)}$$

2) PUE: The energy efficiency of the data center is typically measured using power usage effectiveness (PUE). Lower the PUE, higher the energy efficiency of the data center. PUE is defined using Equation (2) stated below:

$$PUE = \frac{\text{Total data center power}}{IT \text{ power}} \quad \text{Equation (2)}$$

The present invention makes use of PUE predictor tool for predicting PUE of the data center for different design and operational parameters. The PUE predictor tool consists of three components namely, an IT power predictor, a cooling power predictor and a power losses predictor. The total data center power is calculated as sum of IT power, cooling power and power losses.

The IT power predictor tool calculates the power consumed by the IT equipment based on their utilization data. The tool first classifies IT equipment based on their type and manufacturer. Types of the IT equipment include but not limited to blade server, rack server, network server, storage disk etc, and their specifications. However, manufacturer related classification include the manufacturers such as HP, IBM, Dell, and Cisco. The predictor tool has inbuilt correlations for calculating power consumed by IT equipment for any utilization levels. The tool also has provision to include new types of IT equipment and their power vs. utilization correlation. Once power for the IT equipment based on their utilization level is calculated, the tool calculates the total rack power based on its inventory. The sum of power of all IT equipment in all racks gives the total IT power of the data center.

The cooling power calculator calculates the power consumed by entire cooling infrastructure and all associated equipment for various operating conditions. The equipment related to cooling infrastructure may involve fans, pumps, chillers, cooling towers, condensers, evaporators etc. The calculator takes into account design as well as operating parameters related to cooling infrastructure and associated equipment. The design parameters related to cooling infrastructure may include parameters like type of cooling infrastructure, and its sizing. Design parameters related to equipment might include make, type, sizing, rating etc. Operating parameters related to cooling infrastructure and associated equipment may involve various variables related to flow, pressure, temperature, heat at various locations. For example, design parameters of chiller may include type of chiller, sizing of chiller etc and operating parameters of chiller may include cooling load on chiller, chilled water set points etc.

There are various methods by which the cooling power calculator can be developed. Some of the methods are:

A) Experimentation on actual cooling infrastructure: The actual cooling infrastructure as whole can be run at various operating conditions and corresponding cooling power can be measured. For example, the cooling infrastructure and associated equipment may be run for various loading conditions and various set points like supply air temperature set point, and chilled water set point, and corresponding power consumed by entire cooling infrastructure and all associated equipment can be calculated. Various regression techniques can be used to correlate the cooling power with the operating parameters.

B) Development of system level model for cooling infrastructure using component models: The component level models for various components of cooling infrastructure and associated equipment can be developed to predict the performance characteristics of individual components. These models then can be combined together to develop system model which predicts performance of entire cooling infrastructure. This system model is the simultaneous solution of the equations representing the performance characteristics of all components in the cooling infrastructure as well as appropriate equations for energy and mass balance and equations of state. For example, a system model can be developed using component models of chiller, fan, cooling tower, pump, condenser etc. Further, said system model will predict the performance of the complete cooling infrastructure and hence the associated cooling power for various operating conditions like ambient temperature, chiller water set points etc. The component models are combined into a system model according to the relationship among components in terms of appropriate coupling parameters. For example, in order to model the refrigeration cycle in a chiller, the component models of compressor, evaporator, condenser, and capillary are connected together by transferring of coupling parameters. Compressor model may take the outlet refrigerant enthalpy and pressure of the evaporator from evaporator model as well as the refrigerant pressure of the condenser from condenser model.

The component models can be developed using the data obtained from manufacture. Various regression techniques can be used to correlate the data with the operating parameters. For example, the data consisting of cooling capacity and power consumed by chiller for various operating parameters can be used to develop component model for that chiller. The component model can also be developed from first principles. These models actually simulate the various physical phenomena involved with the corresponding components. For example, a model can be developed for compressor which predicts the refrigerant mass flow rate, power consumed by compressor and the refrigerant temperature at the compressor exit by simulating the thermodynamic phenomena like polytrophic compression occurring in the compressor.

C) Power Losses predictor: In a data center, various equipments are generally present in the power train, which facilitates the power distribution and conversion from AC to DC or vice versa. These equipments are never 100% efficient; therefore, some energy is lost in these equipments. These equipments efficiency is dependent on their loading level. In this tool, correlations of efficiency vs. loading level are built for various types of equipment such as transformer, uninterrupted power supply (UPS), power distribution units (PDU). These correlations are used to estimate corresponding losses based on their actual loading levels. Moreover, the power consumed by lighting equipment is also considered as power loss. The total power losses are calculated by adding losses of all types of above equipment.

The present invention uses several thermal analysis tools. Thermal analysis is analyzing cooling performance of cooling infrastructure, cooling system and all the associated equipment in the data center. This involves analysis of flow, temperature, heat, pressure related variables, for example, analysis of maximum temperatures occurring at inlets of racks. There are various methods of carrying out this thermal analysis. Some of the typical methods are explained below:

1) Experience based or heuristics method: This method employ use of guidelines, rules of thumb, trial and error and educated judgment for analysis instead of making use of any sophisticated mathematical modeling or exhaustive experimentation. Examples of this method are deciding layout of the data center using just guidelines. They offer time saving approximations in preliminary analysis. For example, while carrying of exploration of efficient layout of the data center, heuristic methods can be used for primary screening of many layouts. This saves time by eliminating the need and associated effort required for analysis that is more sophisticated. As this is an approximate method, it is important to understand its limitations while applying.

2) Lumped or gross modeling: The gross model for the data center calculates the overall energy and flow balance of the data center. In this analysis, the overall heat load in the data center is compared with the overall cooling capacity. In addition, it also compares the total flow requirement of servers and total supply of cold air from CRAC. This analysis determines the adequacy of the cooling infrastructure. This analysis can be carried out for the whole data center or for specific parts of the data center.

3) Physics based models: Physics based models characterize various phenomena like flow, heat transfer occurring in the data center in detail and predict performance of cooling infrastructure. Computational fluid dynamics (CFD) based models are commonly used in which partial differential equations of conservation of mass, momentum, and energy are calculated. The solutions of these equations predict flow variables and temperature at every point in the data center.

Figure 2:
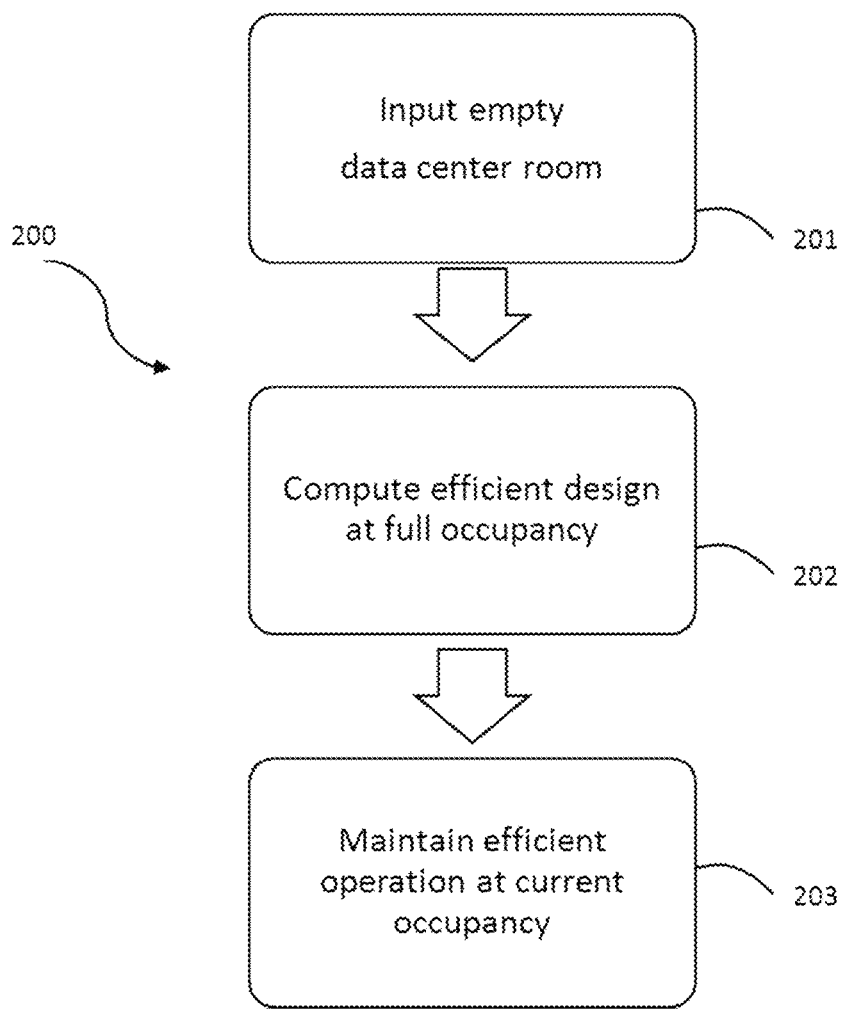
FIG. 2, A flow chart illustrating steps of Iso-PUE process for efficient designing and operating of cooling infrastructure in a new data center during ramp-up period.

FIG. 2 shows the Iso-PUE process (200) for efficient designing and operating of cooling infrastructure in a new data center during ramp-up period. The process starts with capturing a design aspect of an empty data center room (201). The design aspect of empty data center room is decided when design of the whole facility which houses the data center is in process. In the next step (202), exploration using various thermal analysis tools is carried out for efficient design parameters of the data center like details of partitioning, placement of racks, CRAC, tiles, and panels which give lowest PUE calculated using PUE predictor. In the next step (203), efficient operation of the partially occupied data center is determined and maintained. The efficient operation of partially occupied data center is based inefficient placement of new servers and efficient operation of cooling units during continuous operation of the data center. The Iso-PUE process (200) is completed when the data center is fully occupied.

Figure 3:
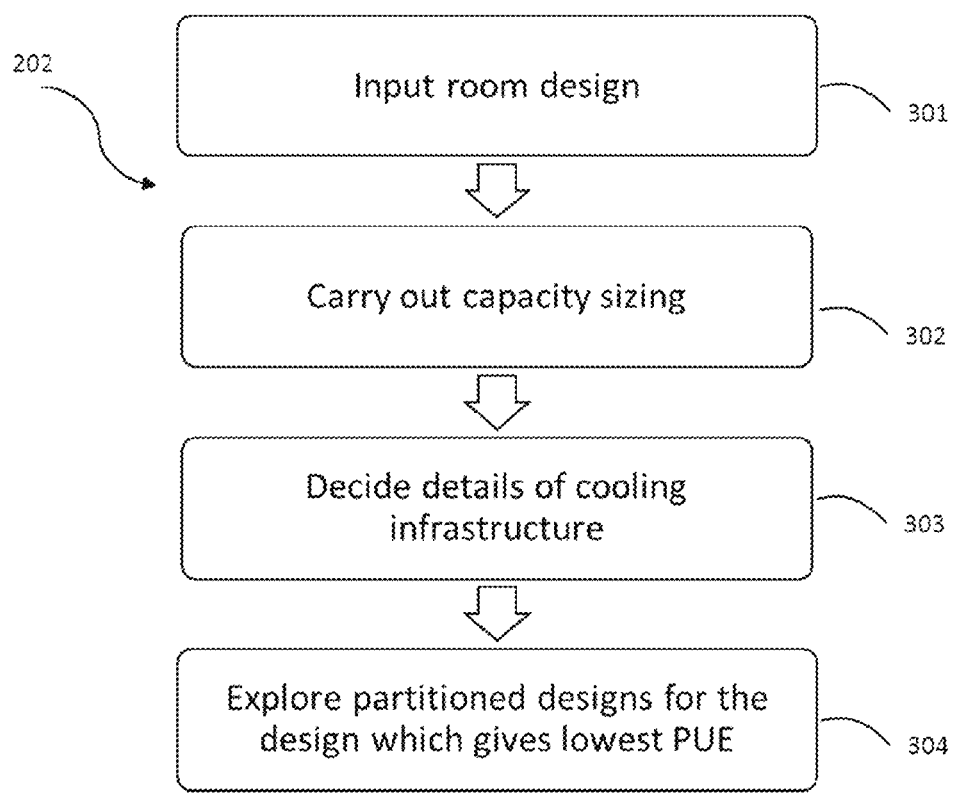
FIG. 3, Flow diagram showing steps of exploration of efficient design of a data center at full occupancy according to an embodiment.

FIG. 3 shows the work flow for the designing of efficient data center. The workflow starts with the original design of empty data center room 301. Original design of empty data center room can be provided by any consultants such as architects, data center managing team. In the next step 302, the analysis for capacity sizing of the data center is carried out. Data center managers decide target expected capacity of the data center in terms of number of racks, number of servers etc. from current needs and expected future needs and from the size of the empty room. Typical configuration of servers, power, and networking equipment are also decided by respective teams. From this information, expected heat load and heat load density in the data center can be estimated. The heat load and heat load density dictates sizing of cooling infrastructure, etc. Heuristics method and lumped modeling can be used to decide sizing of cooling infrastructure.

In the next step 303, the type of the cooling infrastructure is decided. Type and details of the cooling infrastructure to be chosen, largely depends on the heat load and heat load density i.e. distribution of heat load. For example, a data center with high-density heat loads may require large plenum depth or in-row coolers. Type and details of cooling infrastructure include provision of under-floor and overhead plenum, types and capacity of cooling units such as DX cooler, in-row cooler, types and size of auxiliary equipment such as chiller, fan, cooling tower, pump, condenser etc. Heuristics method, lumped modeling, as well as cost analysis are used to choose between various options of cooling infrastructure, cooling units and auxiliary units and to decide their sizing. In the next step 304, details of partitioning of data center room are decided and the partitioned designs are explored for the design which gives lowest PUE.

Usually, the time of ramping up of a new data center ranges from few months to few years. Therefore, data centers run on partial occupancy for a long time. During this ramp up period, the big data center room needs to be cooled with underutilized cooling infrastructure, which is designed for full occupancy. Partitioning of data center creates smaller data centers. So even when the occupancy level of whole data center is low, the individual occupancy level of these smaller data centers is high. This increases operational efficiency of cooling infrastructure, as smaller space needs to be cooled. For example, if the data center is partitioned into two parts and a separate chiller is provided for each part then these two small chillers will run on more loading and hence more efficiency than a big chiller provisioned for whole data center.

Figure 4:
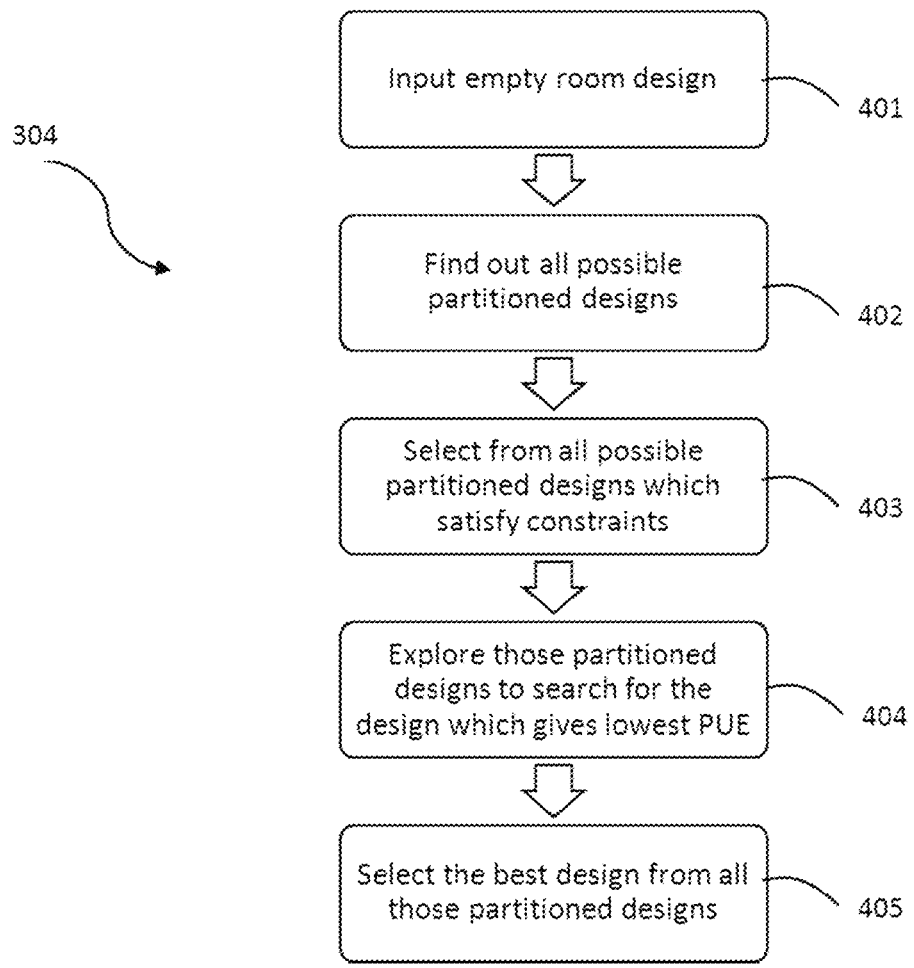
FIG. 4, Flow diagram showing steps of exploration of partitioned designs to search for the partitioned design which gives lowest PUE according to an embodiment.

FIG. 4 shows the procedure 304 for exploration of partitioned designs to search for the partitioned design which gives lowest PUE. The first step 401 is to take design of empty data center room, which is provided by an architect or any other consultant. In the next step 402, all the possible partitioned designs are found out by heuristics method. One of the major factors considered while partitioning of data center is the ramp up plan to ensure maximum possible occupancy of smaller data centers for maximum possible duration during ramp up period.

Once several partitioned designed are created then the selection of those partitioned designs which satisfy constraints is carried out in step 403. Thus, only few partitioned designs are left for exploration of efficient design after this step 403. The exploration of these designs is then carried out to search for the design which gives lowest PUE in the next step 404. Detailed description of this step 404 is provided in the following paragraphs. Once all the partitioned designs are explored, the best design which gives lowest PUE is selected in the step 405.

The constraints considered in the above step 403 are constraints related to the requirement of network wiring topology, power supply wiring topology, cooling fluid piping arrangement, cadging of racks, aesthetic look etc. Cadging of the racks is related to separation of bunch of racks from other racks to secure those racks for the particular client or operation. The cadging is primarily done for the data security.

Figure 5:
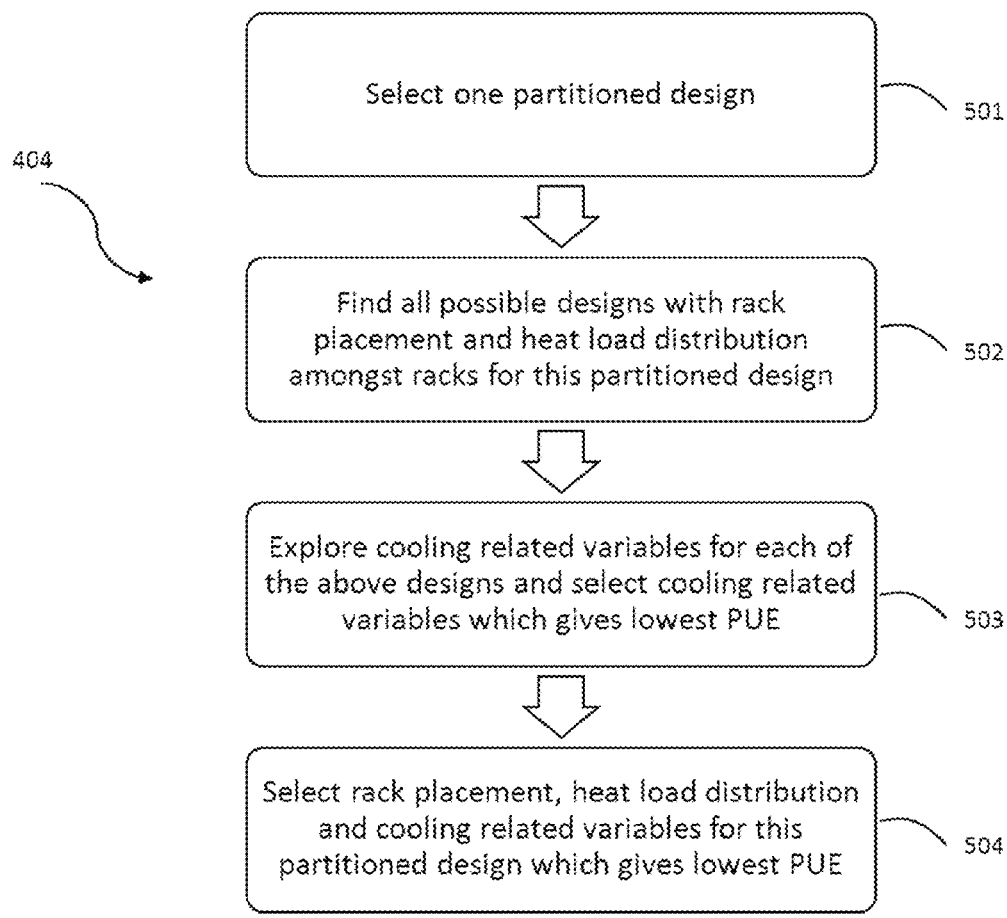
FIG. 5, Flow diagram showing steps of exploration of different design parameters for a partitioned design according to an embodiment.

FIG. 5, shows the flow diagram showing steps of exploration of different design parameters for a partitioned design. The first step 501 of this exploration of efficient design is to select one of the partitioned designs obtained after the step 403. The next step 502 is to get various possible designs with all the specific details such as rack placement and heat load distribution amongst racks in above partitioned designs using heuristics method. For example, guidelines such as ASHRAE guidelines are used to decide for widths of cold and hot aisles. Various teams like server, network, and power teams decide placement of components like racks, wires, pipes, PDUs, cages etc inside the data center room. These teams also decide the probable location of various servers and networking equipment among these racks. This dictates the heat load distribution in the data center. These rack placement and heat load distribution decisions may have various constraints like network and power topology, security constraints on cages placement etc. For example, it may be mandatory to keep few specific racks together separated from other racks with the help of a cage. These constraints have to be satisfied while deciding placement of racks.

In the next step 503, the exploration of cooling related variables is carried out to search for variables which give lowest PUE. Detailed description of this step is explained in later paragraphs. This step gives the many combinations of rack placement, heat load distribution and cooling related variables and corresponding PUE for the selected partitioned design. Then the next step 504 is to compare PUE of all such configurations and select the rack placement, heat load distribution and cooling related variables for the selected partitioned design which gives lowest PUE.

Figure 6:
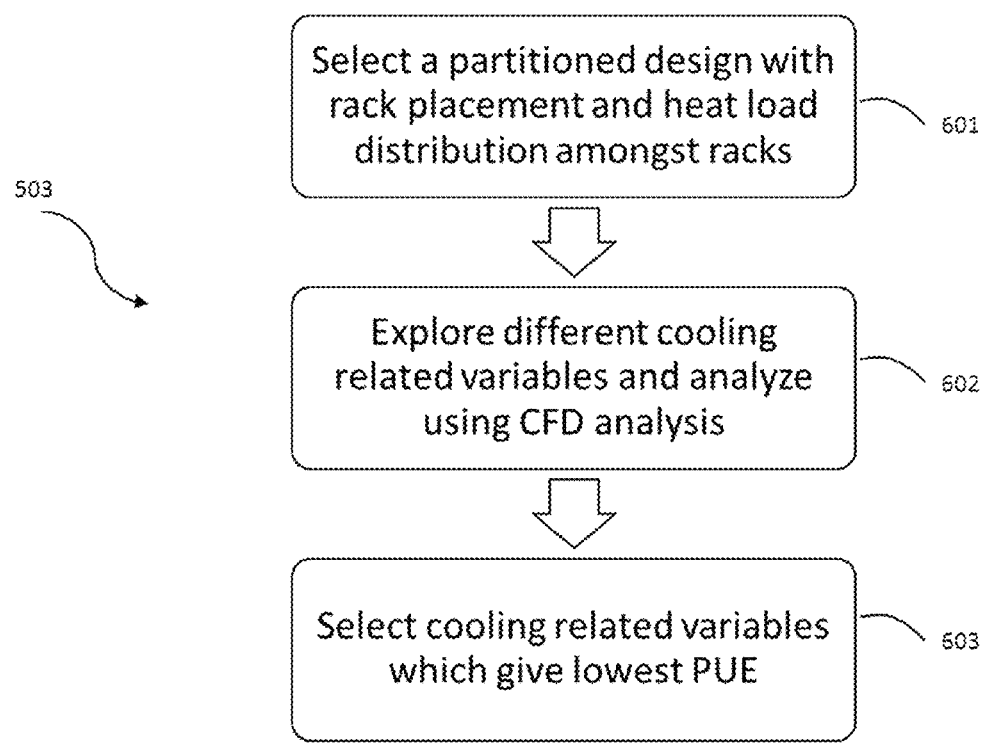
FIG. 6, Flow diagram showing steps of exploration of efficient cooling related variables according to an embodiment.

FIG. 6 illustrates the process 503 for exploration of efficient cooling related variables with respect to PUE. The process starts with the selection of one of the designs created in the step 502. In the next step 602, different combinations of placement of CRAC, placement of tiles, placement of panels and operating parameters of CRAC are found out for the design using heuristics method. For example, more number of cooling units may be placed nearer to region with high heat load or aisle containment panels are placed. Lumped analysis and CFD analysis are carried to analyze all the configurations and PUE is calculated for all the configurations. In the next step 603, the CRAC placement, placement of tiles and operating parameters of CRAC that give lowest PUE is selected.

The process 404 is repeated for all partitioned designs and selection of the efficient combination of rack placement, heat load distribution and cooling related variables with lowest PUE is determined for each partitioned design. The efficient combination of rack placement, heat load distribution and cooling related variables for each of the partitioned designs are then compared in the step 405 to select the efficient partitioned design having efficient combination of rack placement, heat load distribution and cooling related variables. Thus the selected design is the design which has the lowest PUE among all the possible mappings. This design is the efficient design for full occupancy which needs to be implemented while building the data center.

The determined efficient design is then considered for implementation during ramping up stage of the data center. Ramping up process can take from few months to few years. During this ramp up period, operational efficiency can be maintained at efficient level for current occupancy in step 203.

Figure 7:
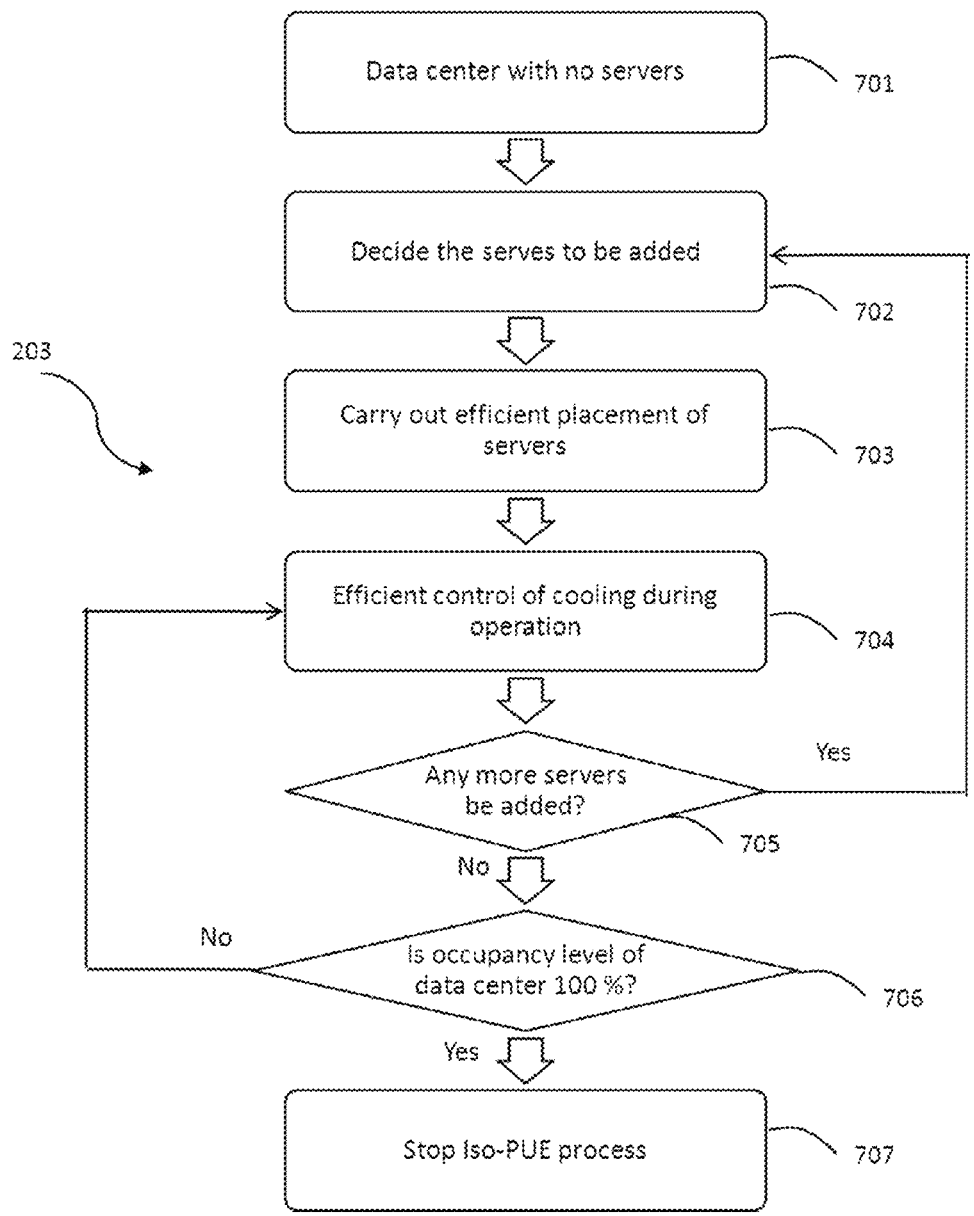
FIG. 7, Flow diagram showing steps of maintaining efficient operation at current occupancy FIG. 8, Flow diagram showing steps of identifying efficient location of new servers according to an embodiment.

FIG. 7, Flow diagram showing steps of maintaining efficient operation at current occupancy 203. The process starts with data center with no servers in step 701. In the step 702, the servers to be added in the data center are decided. In the step 703, efficient placement of servers according to cooling efficiency considerations is carried out which is explained is later sections. In the step 704, the efficient control of cooling units is carried out during continuous operation of the partially filled data center. The efficient operation of cooling units is ensured when only required amount of cooling is supplied by the cooling units. The operating parameters of cooling units like set points, on and off status are controlled to maintain the recommended temperature profile in the data center as well as to maximize cooling efficiency of cooling units. Workload scheduling and placement decisions can also be taken according to the cooling provisioning in the data center. This further increases the operating efficiency of the data center. In the step 705, it is checked whether any more servers needs to be added in the data center. If the result of the step 705 is "Yes," the process returns to step 702 to add the new servers. If the result of the step 705 is No, then the process proceeds to step 706. In the step 706, it is checked whether the occupancy level of data center is 100%. If the result of the step 706 is No, the process returns to step 704 in which, the cooling units are controlled efficiently. If the result of the step 706 is "Yes," then the Iso-PUE process stops as the data center is fully occupied.

Figure 8:
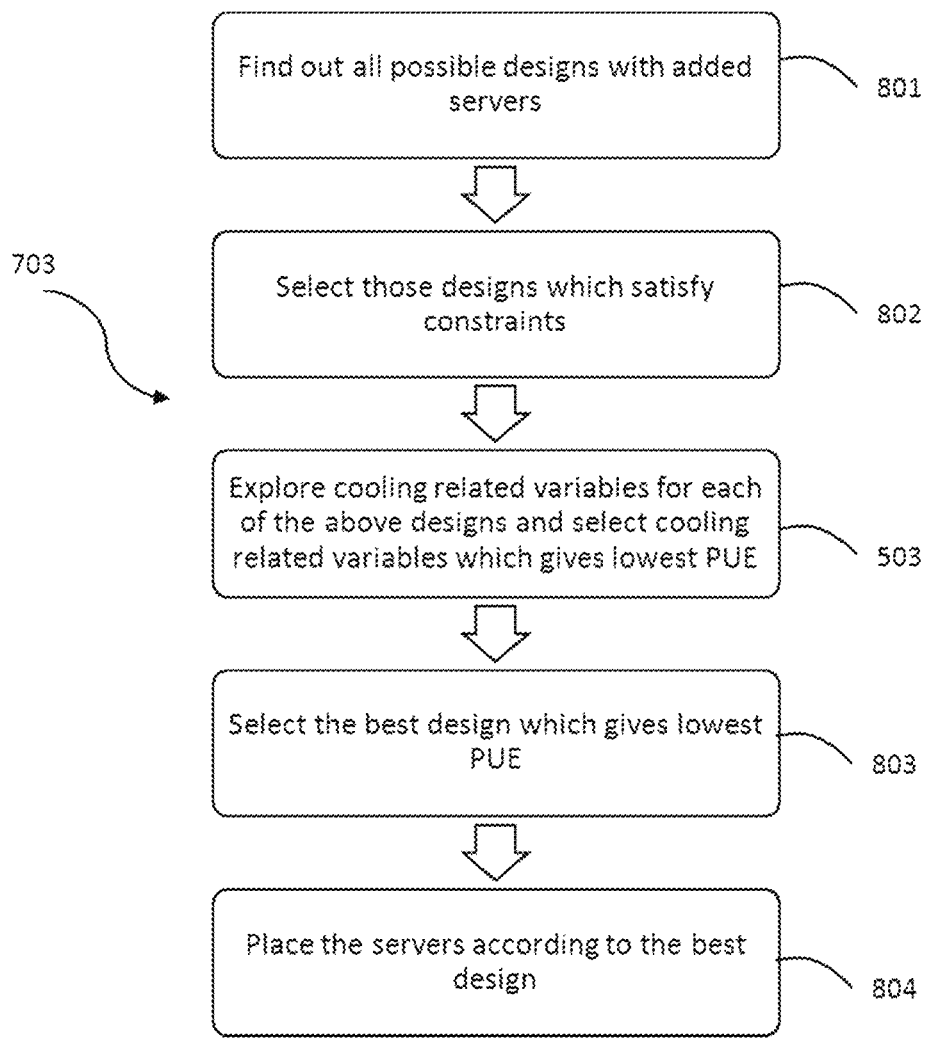

FIG. 8 shows the flow diagram of process 703, showing steps of identifying efficient location of new servers. The process starts with step 801 in which the new servers are added in the design of current state of occupancy of the data center in all possible ways and hence all possible designs with the added servers are found out using heuristics method. In the step 802, initial screening of designs is carried out. In this step 802, various constraints such as constraints set by data center manager, network team, power managing team, servers managing team, and security teams etc are checked for all the designs. Those designs which satisfy constraints are selected. In the next step 503, exploration for efficient cooling related variables is carried out using lumped analysis and CFD analysis as explained earlier. This analysis gives the location of the server which has efficient PUE for the each of the designs. In the next step 803, the design, which has lowest PUE among all above designs, is selected. In the next step 804, the servers are added in actual data center according to the design selected in step 803.

Figure 9:
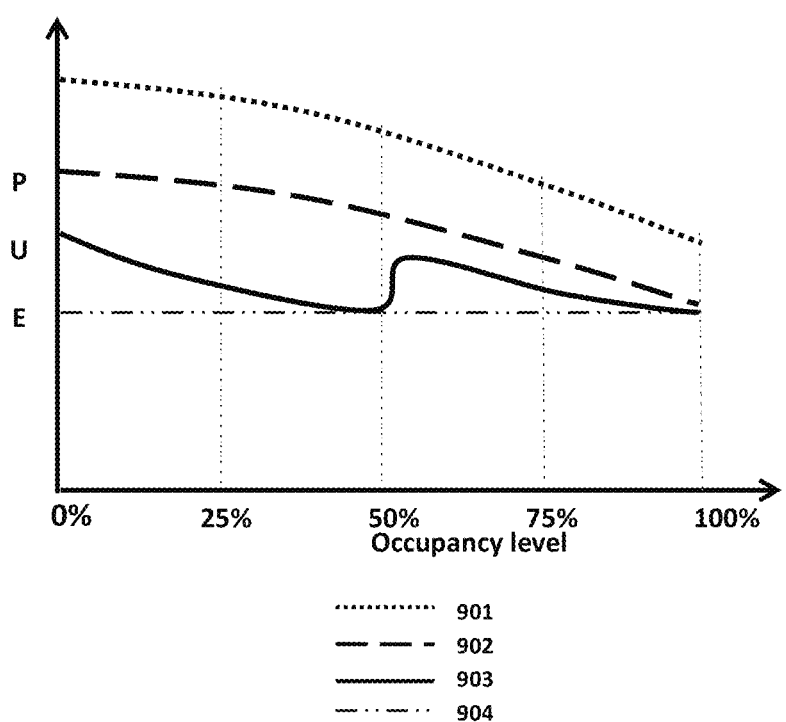
FIG. 9, Variation of PUE with occupancy level for various scenarios according to an embodiment.

FIG. 9 shows the graphic representation of variation of PUE of a data center in the ramp-up stage with occupancy level for various scenarios.

Various scenarios considered are:
1) Scenario 1 (901): Data center without any exploration for efficient design and operation parameters employed
2) Scenario 2 (902): Data center with exploration carried out for efficient design but not for ramp up strategy 3) Scenario 3 (903): Data center which uses Iso-PUE process, for which exploration carried out for efficient design as well as employs efficient ramp up strategy.

In case of all the scenarios, general trend is that PUE is very high for very low occupancy levels and PUE decreases with increase in occupancy level. At low occupancy levels, the cooling infrastructure runs on lower cooling loads. The servers may be placed at distributed locations in the data center. Therefore, the cooling infrastructure has to cool the big but mostly empty data center room, which leads to wastage of cold air. The loading on cooling equipment like chiller or CRAC is also low which decreases their efficiency. All these reasons lead to low efficiency of the cooling infrastructure and high PUE. As occupancy increases, the cooling load on cooling infrastructure-cooling devices increases which leads to decrease in PUE. The difference in PUE between the curve for scenario 1 (901) and scenario 2 (902) is because of the cooling exploration carried out of the efficient design. However, since there has been no attempt to explore efficient ramp-up strategy, the PUE remains on higher side in the scenario 2 (902).

The curve of scenario 3 shows the variation of PUE with respect to occupancy level for a specific case when the data center under consideration is divided into two near equal parts as suggested by the Iso-PUE process. Only the first part of the data center is filled initially. Therefore, its occupancy level is twice that of the occupancy of whole data center and the size is half of that of full data center. Moreover, the first data center may have dedicated equipment for example chiller which are half in capacity and have twice the loading as compared to scenario 2 (902). So the devices in scenario 3 (903) run more efficiently. All these reasons lead to lower PUE at low occupancy levels in the scenario 3 (903) than other two scenarios. Later it follows similar trend of decreasing PUE with occupancy level because of the reasons stated above. At 50% occupancy level of the whole data center, the first part is nearly fully occupied by the servers and hence its PUE reaches similar to the efficient PUE at full occupancy 904. When the data center occupancy increases beyond 50%, the second part of the data center becomes operational. The PUE of the data center for occupancy just above 50% jumps suddenly. This jump occurs as the second data center and associated equipment are running on very low loads and hence lower efficiency. The PUE curve later follows similar trend as of other scenarios. At 100% occupancy level, both the parts are fully occupied and hence then PUE again reaches to the efficient PUE of the whole data center. Similar discussion is applicable for the case when data center is partitioned in more than 2 parts. The resulting curve will show different nature but will still be on lower side than that of other scenarios.

Working Example of the Invention

According to an exemplary embodiment a realistic and a hypothetical data centers are compared to demonstrate the utility and efficiency of present disclosure, for efficient designing and maintaining of the data center. An empty room having area of 316.16 sq m. is used for the comparison. The design and operational parameters of data center is captured, in present embodiment the parameters are: 92 racks arranged in a cold-hot aisle fashion, with 10 high density blade server racks, 42 server racks, 8 storage racks, 4 superdomes, 14 network racks and 14 switch racks. A PUE predictor tool determines the maximum power consumed by all the equipment, which is 320 kW for the present embodiment. Accordingly the cooling infrastructure is mapped with the rack placement and heat load distribution. For the present embodiment the data center has under-floor and overhead false plenums of 0.8 m and 0.6 m respectively, two chillers with capacity of 248 kW each provide cooling to CRAC. Further, 8 CRAC of 75 kW each provide cold air to the racks, the data center is considered to have both under-floor and overhead plenums. The sizing of power infrastructure is estimated by the PUE tool as transformer of capacity 1200 kW, 4 UPS of capacity 200 kW each and 8 Power Distribution Unit (PDU) of capacity 80 kW each.

Based on the data captured and estimated CFD tool is used for at least one permutation and a model is validated and analyzed. Based on the implementation of the present disclosure an efficient partitioning, rack placement, heat load distribution and cooling related parameters is selected from the computed permutations.

Further, two scenarios during ramping process of this data center are then considered to demonstrate the utility of this invention during efficient operation of the data center. The occupancies of data center considered for these scenarios are 10% and 50%. The Iso-PUE process is then used to explore efficient operation of the data center in these scenarios. In the first scenario, the load is spread in only one part of the data center. In case of second scenario, the first part is completely filled. As only one part is operational in both the scenarios, only one chiller, 2 UPS and 4 PDU are operational. These scenarios are simulated using CFD model to explore efficient cooling related parameters and server placement with the help of PUE predictor.

To benchmark the effectiveness of the invention, a situation of designing and operating the data center without using the invention is then considered. For this case, the data center is considered to have no partition separating the data center and only one bigger chiller with capacity of 495 kW is considered to be providing cooling. CFD model along with PUE predictor is then used to decide on efficient design which includes rack placement, heat load distribution and cooling related parameters. Similar scenarios of 10% and 50% occupancy are also considered. In both the cases, the load is spread throughout the data center and all UPS, PDU and the chiller are operational. These scenarios are simulated using CFD model to calculate their PUE with the help of PUE predictor. Hence, efficient operation throughout the ramping up stage is not ensured here as the invention is not used.

Figure 10:
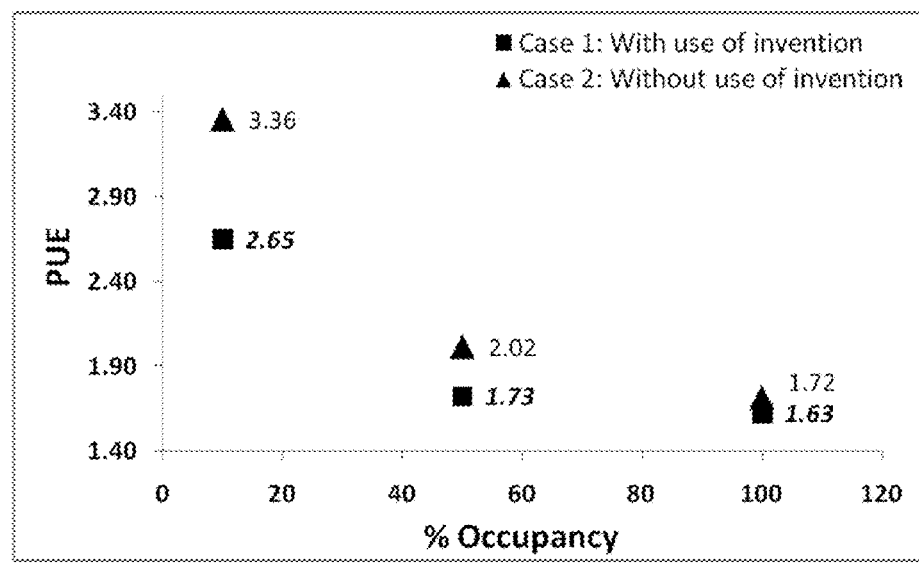
FIG. 10, Table illustrating variation of PUE with occupancy level for various scenarios in exemplary embodiment.

FIG. 10 shows a table illustrating the PUE for various occupancies and for the cases of with and without use of the invention. Following observations can be drawn from the figure:

1) PUE for case 1 is lower than that of case 2 throughout the ramping up of data center. This is because efficient operation is not explored for case 2. But the PUE for full occupancy for both the cases is nearly same as the exploration for efficient design is done for both the cases.
2) PUE for very low occupancy like 10% is high due to the reasons explained before. But as efficient operation is explored for case 1, PUE remains lower than case 2 even for low occupancies.
3) For case 1, PUE at 50% and 100% occupancy is within narrow range because of partitioning of the data center. Hence, as number of partitions is increased, the PUE will remain within narrow range for more duration during ramping up stage.

We claim:

1. A method for efficient configuration of a data center at full occupancy, having an initial empty occupancy level, the method comprising:
   capturing a plurality of design parameters of a data center at an empty occupancy level;
   identifying, based on the design parameters, a plurality of partitioned designs for the data center at the empty occupancy level;
   determining a plurality of rack placements and heat load distribution amongst racks within each of the partitioned designs;
   mapping cooling infrastructure parameters associated with each of the rack placements and the heat load distribution for at least one partitioned design;
   analyzing cooling performance for the mapped cooling infrastructure parameters using a Computational Fluid Dynamics (CFD) tool;
   determining Power Usage Effectiveness (PUE) using a PUE predictor tool for each of the partitioned designs by integrating an information technology (IT) power predictor to calculate power consumed by an IT equipment upon classifying the IT equipment based on type and manufacturer, a cooling power predictor to calculate power consumed by the cooling infrastructure taking into account of design parameters and operating parameters related to the cooling infrastructure, and a power losses predictor to calculate power consumed in lighting and losses in power distribution by estimating correlation of efficiency and loading level of an equipment, and calculating a total data center power as sum of an IT power calculated from the IT power predictor, a cooling power calculated from the cooling power predictor, and power losses calculated from the power losses predictor; and
   configuring the data center based on a partitioned design among the partitioned designs having optimum cooling performance and lowest PUE upon determining efficient combination of the rack placement, the heat load distribution and cooling related variables.

2. The method as claimed in claim 1, wherein the design parameters include at least one of parameters associated with the data center having empty occupancy level, cooling infrastructure, a computer room air conditioner (CRAC), plenum and placement of airflow altering components such as baffles or panels.

3. The method as claimed in claim 1, wherein the cooling infrastructure parameters comprise CRAC placement, tile placement, panel placement, and operating parameters of CRAC.

4. The method as claimed in claim 3, wherein the operating parameters of CRAC are associated with supply temperature and flow rates of CRAC.

5. A processor implemented method for dynamically maintaining Power Usage Effectiveness (PUE) of a data center constant or within a narrow range around an efficient level during a ramp up period, the method comprising:
   capturing a plurality of design and operational parameters at an occupancy of a data center at a point in time;
   determining placements of servers based on the design and operational parameters;
   mapping cooling infrastructure parameters for the placements of servers;
   analyzing cooling performance for the placements of servers using a CFD tool;
   determining PUE using a PUE predictor tool for the placements of servers by integrating an information technology (IT) power predictor to calculate power consumed by an IT equipment upon classifying the IT equipment based on type and manufacturer, a cooling power predictor to calculate power consumed by the cooling infrastructure taking into account of design parameters and operating parameters related to the cooling infrastructure, and a power losses predictor to calculate power consumed in lighting and losses in power distribution by estimating correlation of efficiency and loading level of an equipment, and calculating a total data center power as sum of an IT power calculated from the IT power predictor, a cooling power calculated from the cooling power predictor, and power losses calculated from the power losses predictor; and
   configuring and operating the data center based on a placement of servers among the placements having lowest PUE upon determining efficient combination of a rack placement, a heat load distribution and cooling related variables, and optimum cooling performance.

6. The method as claimed in claim 5, wherein
   the design parameters include at least one of cooling infrastructure, a computer room air conditioner (CRAC), racks, heat generating equipment in racks, placement of components such as CRAC, tiles, plenum, racks, or placement of airflow altering components such as baffles or panels; and
   the operational parameters include at least one of supply temperature and flow rates of CRAC, actual power consumed by racks, or airflow of racks.

7. The method as claimed in claim 5, wherein the cooling infrastructure parameters include at least one of CRAC placement, tile placement, panel placement, or operating parameters of CRAC.

8. The method as claimed in claim 7, wherein the operating parameters of CRAC include at least one of supply temperature or flow rates of CRAC.

9. A system for efficient configuration of a data center at full occupancy, having an initial empty occupancy level, the system comprising:
   a memory device that stores a set of instructions; and
   at least one processor to execute the instructions to:
      capture a plurality of design parameters of a data center at an empty occupancy level;
      identify, using the design parameters, a plurality of partitioned designs for the data center at the empty occupancy level;
      determine a plurality of rack placements and heat load distribution amongst racks within each of the partitioned designs;
      map cooling infrastructure parameters associated with each of the rack placements and the heat load distribution for at least one partitioned design;
      analyze cooling performance for the mapped cooling infrastructure parameters using a Computational Fluid Dynamics (CFD) tool;
      determine Power Usage Effectiveness (PUE) using a PUE predictor tool for each of the partitioned designs by integrating an information technology (IT) power predictor to calculate power consumed by an IT equipment upon classifying the IT equipment based on type and manufacturer, a cooling power predictor to calculate power consumed by the cooling infrastructure taking into account of design parameters and operating parameters related to the cooling infrastructure, and a power losses predictor to calculate power consumed in lighting and losses in power distribution by estimating correlation of efficiency and loading level of an equipment, and calculating a total data center power as sum of an IT power calculated from the IT power predictor, a cooling power calculated from the cooling power predictor, and power losses calculated from the power losses predictor; and configure the data center based on a partitioned design among the partitioned designs having optimum cooling performance and lowest PUE upon determining efficient combination of the rack placement, the heat load distribution and cooling related variables.

10. The system as claimed in claim 9, wherein the design parameters include at least one of parameters associated with the data center having empty occupancy level, cooling infrastructure, a computer room air conditioner (CRAC), plenum and placement of airflow altering components such as baffles or panels.

11. The system as claimed in claim 9, wherein the cooling infrastructure parameters comprise CRAC placement, tile placement, panel placement, and operating parameters of CRAC.

12. The system as claimed in claim 11, wherein the operating parameters of CRAC are associated with supply temperature and flow rates of CRAC.

* * * * *